UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY, A CORPORATION OF GERMANY.

ALUMINO-SILICATE OR ARTIFICIAL ZEOLITE.

No. 914,405.    Specification of Letters Patent.    Patented March 9, 1909.

Application filed April 15, 1907. Serial No. 368,366. 

*To all whom it may concern:*

Be it known that I, ROBERT GANS, a subject of the German Emperor, residing at Pankow, near Berlin, Germany, have invented certain new and useful Improvements Relating to Alumino-Silicates or Artificial Zeolites, of which the following is a specification.

My application for Patent No. 357,997, filed 18th February 1907 describes a process for obtaining crystalline zeolites or hydrated alumino-silicates, which are easily permeable and do not form colloids or gelatinous solutions, by adding to the melts of alumina-minerals with caustic alkalies or alkali-silicates or carbonates a sufficient quantity of silicic acid, to convert the whole of the alkali into alkali silicate. In that case the formation of crystalline zeolites is therefore due to the addition of silicic acid. Recently I have succeeded in obtaining the said crystalline zeolites having a pronounced interchanging faculty by substituting for the silicic acid boracic acid, phosphoric acid, nitric acid, sulfuric acid or other inorganic acids or their salts. Eminently suitable for this purpose is boracic acid and its salts.

The composition of the zeolites or hydrated alumino-silicates obtained as described varies according to the proportions of the materials used for the production of the melt.

Among the great number of possible compositions of the melt the following two examples may be mentioned:—

1. The following materials are mixed together, then melted and then extracted with water, viz:

| | | |
|---|---|---|
| Kaolin | 3 | parts by weight. |
| Melted borax | 2.4 | " |
| Sodium carbonate | 6.5 | " |

After extraction with water there remain behind undissolved crystalline zeolites having a strong faculty of exchanging their constituents.

The composition may be expressed by the formula $$3SiO_2.Al_2O_3.NaO.$$

2. A mixture of:

| | | |
|---|---|---|
| Kaolin | 2.5 | parts by weight |
| Melted borax | 1.5 | " |
| Sodium carbonate | 5 | " | is melted and thereby crystalline zeolites are produced which will easily interchange their constituents with other components.

If the quantity of inorganic salt or inorganic acid is properly adjusted, the residue after the melt has been extracted with water, consists entirely of crystalline alumino-silicates containing water.

Instead of an alkali-carbonate, as in the above example, caustic alkali may be employed.

The products obtained by my present process may be used for the following purposes: 1. For relieving saccharine juices and molasses from the potash and soda mixed with the same and thereby increasing the quantity of sugar which crystallizes out. 2. For softening water intended for the generation of steam, or in laundries or dye-works and other industrial establishments. 3. For removing iron and manganese from water. 4. For removing undesirable bases and salts from water and solutions.

The purification, or the softening, of water may be effected in a simple manner by filtering the water through a layer of alumino-silicate, containing sodium.

The chemical reaction may take place for example in the manner indicated by the following equation:

$$2SiO_2.Al_2O_3.Na_2O + CaH_2(CO_3) = \\ 2SiO_2.Al_2O_3.CaO + 2NaHCO_3.$$

Molasses and saccharine juices containing potash are filtered through alumino-silicates containing calcium, in which case the chemical reaction taking place may be expressed for example by the following equation:

$$2SiO_2.Al_2O_3.CaO + K_2O = \\ 2SiO_2.Al_2O_3.K_2O = CaO.$$

What I claim is:—

1. The herein described process for the manufacture of artificial zeolites in a crystallized form, which consists in fusing together an alumina-compound and an alkali carbonate with a sufficient quantity of an inorganic salt, to insure that on the extraction of the melt with water there remain only crystalline artificial zeolites.

2. The herein described process for the manufacture of artificial zeolites in a crystalline form, which consists in fusing together an alumina-compound and an alkali carbonate with a sufficient quantity of a carbonate to insure, that after the extraction of the melt with water, there remain only crystalline artificial zeolites.

3. The herein described process for the manufacture of artificial zeolites in a crystalline form, which consists in fusing together an alumina-compound and an alkali carbonate with a sufficient quantity of borax to insure, that after the extraction of the melt with water there remain only crystalline artificial zeolites.

4. The process for the manufacture of artificial zeolites in a crystalline form, which consists in melting together an alumina-compound and an alkali-carbonate with the addition of a sufficient quantity of an inorganic salt, to insure that the whole of the alkali will combine with the alumina and subsequently extracting the melt with water, substantially as described.

In testimony whereof I have set my hand hereunto in the presence of two subscribing witnesses.

ROBERT GANS.

Witnesses:
    PAUL SIEDLER,
    BRUNO FRILING.